May 17, 1927.
J. R. RAIBLE
SHEET METAL KEG
Filed Aug. 18, 1922
1,628,686
2 Sheets-Sheet 1
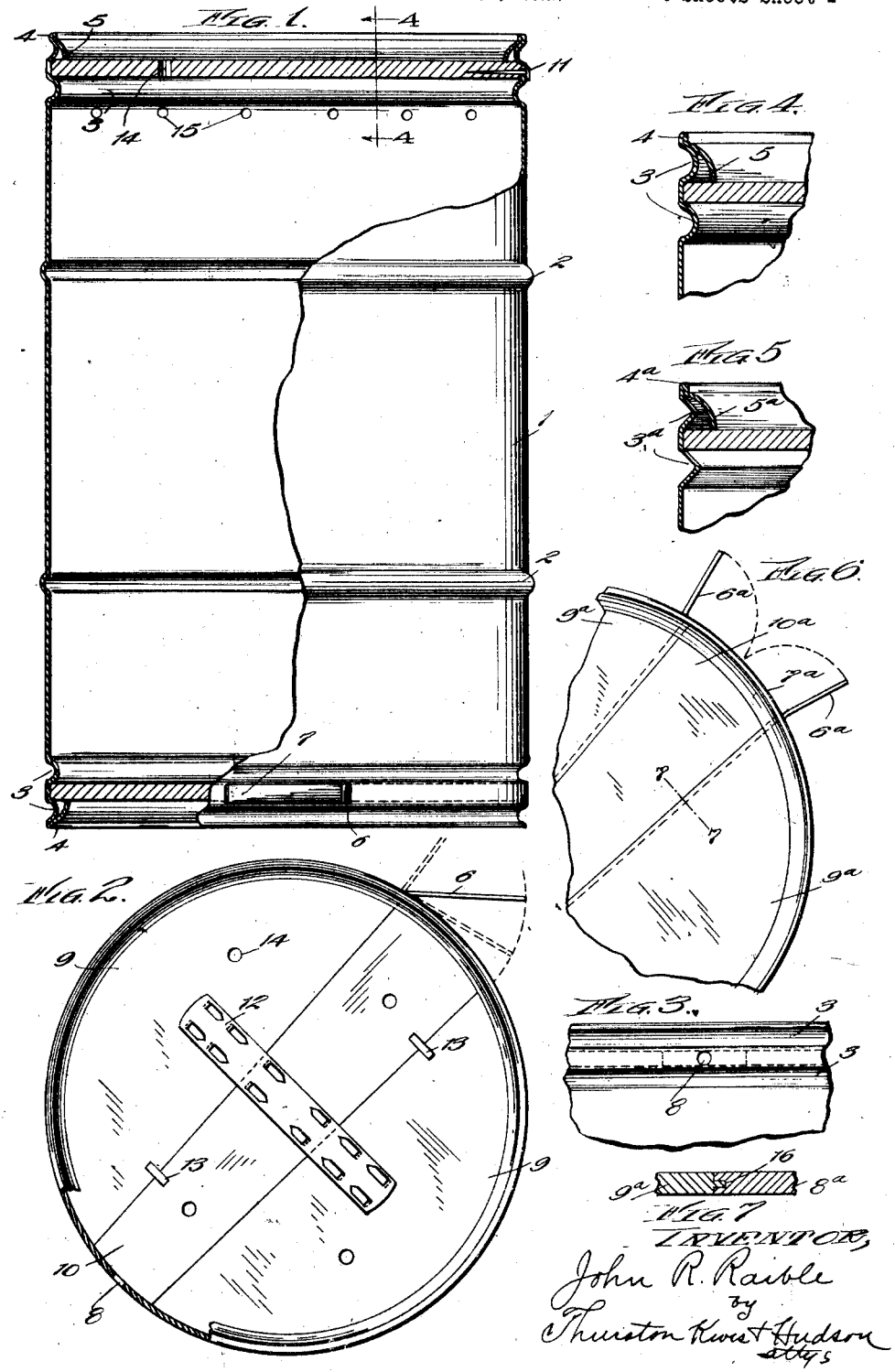

May 17, 1927.
J. R. RAIBLE
1,628,686
SHEET METAL KEG
Filed Aug. 18, 1922   2 Sheets-Sheet 2
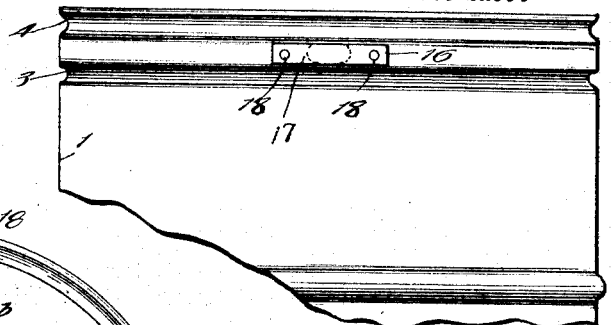
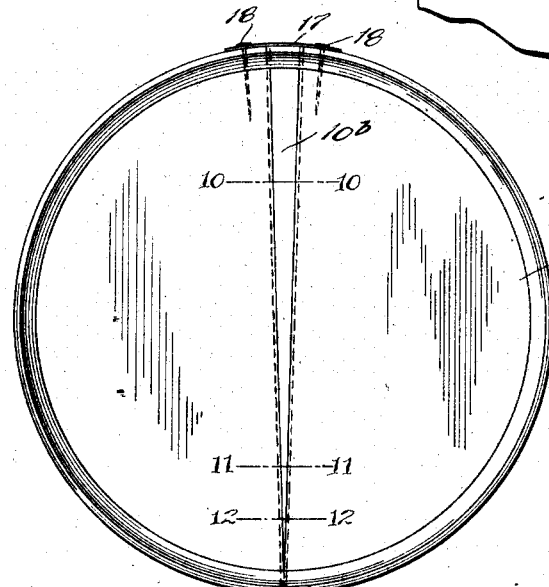
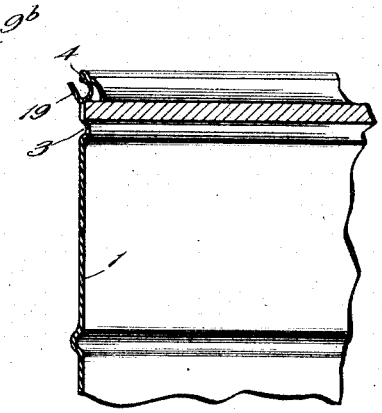
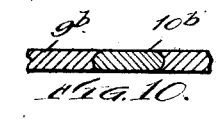
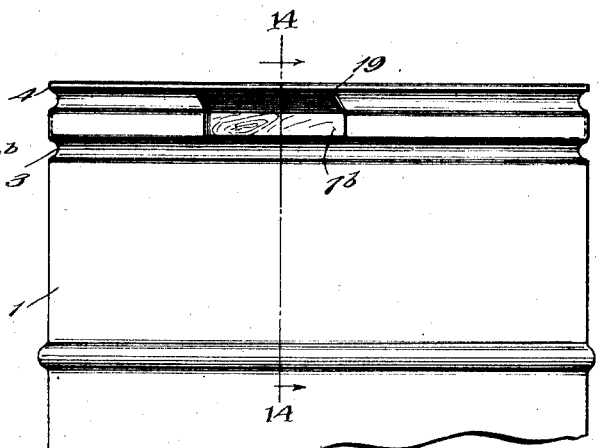
INVENTOR,
John R. Raible
by
Thurston Kwis & Hudson
attys Patented May 17, 1927.

1,628,686

UNITED STATES PATENT OFFICE.

JOHN R. RAIBLE, OF LAKEWOOD, OHIO, ASSIGNOR TO THE GREIF BROTHERS COOPERAGE COMPANY, OF CLEVELAND, OHIO, A CORPORATION OF OHIO.

SHEET-METAL KEG.

Application filed August 18, 1922. Serial No. 582,599.

This invention relates to sheet metal containers, particularly to kegs, half-barrels, whole barrels, such as used for nails, nuts, bolts, chemicals, dry substances or the like.

The main object of the invention is to provide a tight fitting head structure which can be quickly assembled with the sheet metal keg body which is securely held in place on the keg body and which can be quickly removed without injuring the keg body, thereby producing an efficient structure which can be manufactured at low cost.

It is also an object of the invention to provide a head structure which can be removed from the keg without being broken or deformed and which is capable of being reused.

A further object is to provide an expansible sectional head which is expanded to exert considerable pressure upon the inside of the keg body when it is assembled with the keg body.

A further object is to provide chime integral with the sheet metal body outside the head which bears upon the outer face of the head and which, when the head is in place, forms a rigid supporting rim capable of withstanding rough usage.

Other objects will be apparent from the following description and annexed drawings.

Reference should be had to the annexed drawings forming a part of this specification, in which Fig. 1 is a side elevation partially broken away, and showing parts in section; Fig. 2 is a top plan view; Fig. 3 is a fragmentary elevation of the upper portion of the keg showing the knockout opening; Fig. 4 is a section on line 4—4 of Fig. 1; Fig. 5 is a section similar to Fig. 3 showing a slightly modified construction; Fig. 6 is a fragmentary top plan view showing a modified form of the invention; Fig. 7 is a section on line 7—7 of Fig. 6; Fig. 8 is a top plan view showing the modified head construction; Fig. 9 is a fragmentary side elevation of the keg shown in Fig. 8; Figs. 10, 11 and 12 are sections on lines 10—10, 11—11, and 12—12 respectively of Fig. 8; Fig. 13 is a side elevation showing a modified form of tongue for closing the aperture through which the central section of the head is inserted; Fig. 14 is a section on line 14—14 of Fig. 13.

Referring to the annexed drawings, the body 1 of the keg is formed of sheet metal, as is common in the art. The body 1 is substantially cylindrical in form and may be provided intermediate its ends with circumferential stiffening ribs or beads 2. Adjacent its ends the sheet metal body 1 is provided with closely adjacent internal ribs or beads 3 which are continuous throughout the circumference of the body and form between them a continuous circumferential channel to receive the edge of the head. Outside the ribs or beads 3 the free edges of the sheet metal body 1 are turned back upon themselves forming chimes 4 which terminate in inwardly extending flanges 5 which are adapted to engage the outer faces of the heads. The chimes 4 when the head is in place, bear upon the head along its edge at the bases of the beads 3 and also along the edges of the flanges 5 which are spaced inwardly from the beads 3 and are concentric therewith so that impact or pressure on the edge of the chime is taken up at the base of the chime at the bases of the angularly disposed walls thereof.

Between the ribs or beads 3 a tongue 6 is struck-up from the sheet metal body forming, when the tongue 6 is bent outwardly, an elongated opening 7 in the sheet metal body through which a part of the head is adapted to be inserted as will be hereinafter described. Diametrically opposite the opening 7 and between the beads 3 is a small knock-out opening 8 through which a knock-out tool may be inserted. The head consists of a pair of side segments 9, the outer edges of which have substantially the same curvature as the sheet metal body 1 and a central wedge-shaped section 10 which completes the substantially circular head but which is of a width slightly more than enough to complete the circle so that when the wedge section is forced into place, the segments 9 are expanded into tight engagement with the keg body.

In assembling the head with the keg body, the segments 9 are inserted in the channel formed between the ribs 3 with their inner edges adjacent the opposite ends of the opening 7 in the keg body. Since each of the segments 9 is substantially less than a semicircle they can be readily inserted into the channel in the body. After the segments 9 have been put in place the small end of the wedge section 10 is inserted through the aperture 7 and driven inwardly until it is entirely within the keg body. The tongue 6 is then bent into the opening 7, closing the same, and may be secured to the end of the wedge section 10 by suitable fastening means, such as nails 11. The parts of the head may be further secured together by means of a sheet metal cleat 12 or staples 13 or both.

When it is desired to remove the head, the nails 11, cleat 12 and staples 13, will be removed and a suitable knock-out tool will be inserted through the opening 8 and the wedge section 10 will be driven out through the aperture 7.

It is desirable in containers of this type to prevent moisture from precipitating upon the inside thereof. Ventilating openings 14 and 15 in the head and body respectively may be provided for this purpose.

In Fig. 5 of the drawing a slightly modified form of head positioning bead 3ª which is V-shaped in cross section is shown. In this modification the sheet metal body has a chime 4ª and a flange 5ª engaging the outer face of the head in substantially the same manner as in the modification previously described.

In Figs. 6 and 7 a modified form of head structure is shown in which the wedge section 10ª has a tongue and groove connection 16 with the side segments 9ª. In this modification the aperture 7ª is formed by striking up a pair of tongues 6ª which are adapted to be bent down to close the opening and may be secured to the end of the section 10ª by means of nails or other suitable fastening means.

In Figs. 8 to 12 a modified head construction is shown in which the side segments 9ᵇ are substantially semi-circular and have a groove semi-circular in cross section extending lengthwise of their inner edges. A narrow wedge 10ᵇ which has rounded edges fitting in the grooves of the side segments 9ᵇ is inserted through the aperture in the sheet metal wall of the keg driven into place between the segments 9ᵇ and held in place within the keg body by means of a cover strip 17 which is secured over the opening in the wall of the keg by means of nails 18 driven through the strip 17 and the keg body into the wooden head.

In Figs. 13 and 14 the aperture 7ᵇ for inserting the wedge section is formed by severing a tongue 19 at opposite ends and along one longitudinal edge and bending the tongue 19 outwardly. After the head has been assembled the wide tongue 19 is bent back into the aperture 7ᵇ and nailed to the end of the wedge section.

Having described my invention, I claim:

1. A keg comprising a sheet metal body having a continuous internal head receiving groove adjacent one end formed by circumferential internal ribs, said body having a tongue struck up therefrom between said ribs forming an elongated transverse aperture when said tongue is bent outwardly, and a head fitting in said groove and consisting of a pair of side segments and a central wedge shaped section adapted to be inserted through said aperture and to be held in place by said tongue.

2. A keg comprising a sheet metal body having a continuous internal head receiving groove adjacent one end formed by circumferential internal ribs, said body having a tongue struck up therefrom between said ribs forming an elongated aperture when said tongue is bent outwardly and a tool receiving opening diametrically opposite the aperture, and a head fitting in said grooves and consisting of a pair of side segments and a central wedge shaped section adapted to be inserted through said aperture and driven between said side segments to force them into tight engagement with said body and to be held in place by said tongue.

3. A keg comprising a substantially cylindrical body having internal circumferential ribs adjacent an end forming a continuous head receiving channel, the edge of said body outside said ribs being turned back upon itself to form a chime, the back turned edge portion overlying the outer of said ribs and spaced inwardly therefrom the edge of said backturned portion being adapted to engage the head.

4. A keg comprising a substantially cylindrical sheet metal body having an inwardly projecting circumferential bead rolled therein adjacent an end thereof, a head seated on said bead, a second inwardly projecting circumferential bead rolled in said body and adapted to engage the outer side of the head, said body having its edge portion turned back upon itself to form an inturned flange the free edge of which engages the outer side of the head inwardly of said outer bead.

In testimony whereof, I hereunto affix my signature.

JOHN R. RAIBLE.